(12) United States Patent
Motoyoshi et al.

(10) Patent No.: US 9,850,344 B2
(45) Date of Patent: Dec. 26, 2017

(54) POLYCARBONATE RESIN AND OPTICAL FILM

(71) Applicant: TEIJIN LIMITED, Osaka (JP)

(72) Inventors: Tetsuya Motoyoshi, Osaka (JP); Youhei Okada, Osaka (JP); Kouji Oda, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/108,837

(22) PCT Filed: Mar. 13, 2015

(86) PCT No.: PCT/JP2015/057524
§ 371 (c)(1),
(2) Date: Jun. 29, 2016

(87) PCT Pub. No.: WO2015/141592
PCT Pub. Date: Sep. 24, 2015

(65) Prior Publication Data
US 2016/0326311 A1 Nov. 10, 2016

(30) Foreign Application Priority Data
Mar. 20, 2014 (JP) .................. 2014-058167

(51) Int. Cl.
*C08G 64/00* (2006.01)
*C08G 64/16* (2006.01)
(Continued)

(52) U.S. Cl.
CPC ............ *C08G 64/1608* (2013.01); *C08J 5/18* (2013.01); *G02B 1/04* (2013.01); *G02B 5/3083* (2013.01);
(Continued)

(58) Field of Classification Search
CPC ...................... C08J 5/18; G02B 1/04
(Continued)

(56) References Cited
U.S. PATENT DOCUMENTS
2015/0141577 A1* 5/2015 Namiki .................. G02B 1/04
525/146

FOREIGN PATENT DOCUMENTS
EP  1 808 461   7/2007
JP  2-120804    5/1990
(Continued)

OTHER PUBLICATIONS

International Search Report dated Apr. 14, 2015 in corresponding (PCT) Application No. PCT/JP2015/057524.

European Search Report dated Feb. 24, 2017 in corresponding European Application No. 15764960.9.
(Continued)

*Primary Examiner* — Terressa Boykin
(74) *Attorney, Agent, or Firm* — Wenderoth, Lind & Ponack, L.L.P.

(57) ABSTRACT

Provided are a polycarbonate resin and an optical film formed therefrom, having wavelength dispersion characteristics close to the ideal broad bandwidth, excellent durable stability and flexibility, high retardation developability, a low photoelastic constant, and excellent melt processability. The polycarbonate resin comprises a unit (A) represented by the following formula, wherein $R_1$ and $R_2$ each independently represent a hydrogen atom, hydrocarbon group having 1 to 10 carbon atoms optionally containing an aromatic group, or a halogen atom, and m and n each independently represent an integer of 0 to 4:

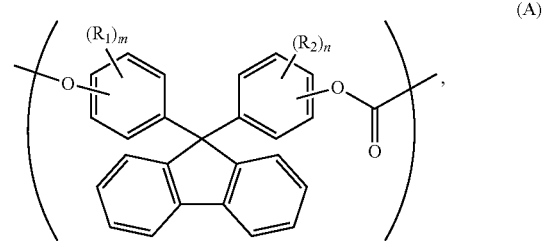

(A)

a unit (B) represented by the following formula, wherein $R_3$ and $R_4$ each independently represent a hydrogen atom, hydrocarbon group having 1 to 10 carbon atoms optionally containing an aromatic group, or a halogen atom, $R_5$ and $R_6$ each independently represent a hydrocarbon group having 1 to 10 carbon atoms optionally containing an aromatic group, s and t each independently represent an integer of 0 to 4, and p and q each independently represent an integer of 1 or more:

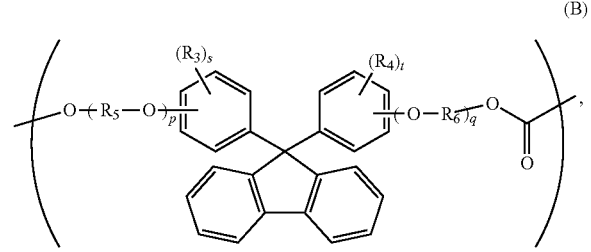

(B)

and a carbonate unit (C) derived from an aliphatic diol compound and/or alicyclic diol compound, wherein the polycarbonate resin satisfies the following expressions (I) and (II): (I) the molar ratio of unit (A) to unit (B), (A)/(B), is 0.2 to 11.0, and (II) the molar ratio of unit (A)+unit (B) to the (A)+unit (B)+unit (C), {(A+B)/(A+B+C)}, is 0.30 to 0.60.

8 Claims, 1 Drawing Sheet

(51) Int. Cl.
    *G02F 1/13363*     (2006.01)
    *G02B 5/30*     (2006.01)
    *C08J 5/18*     (2006.01)
    *G02B 1/04*     (2006.01)
    *C08G 63/02*     (2006.01)

(52) U.S. Cl.
    CPC ....... *G02F 1/13363* (2013.01); *C08J 2369/00* (2013.01); *G02F 2001/133638* (2013.01)

(58) Field of Classification Search
    USPC .................................................. 528/196, 198
    See application file for complete search history.

(56) References Cited

FOREIGN PATENT DOCUMENTS

| | | |
|---|---|---|
| JP | 2010-132782 | 6/2010 |
| JP | 2010-134232 | 6/2010 |
| JP | 2013-76982 | 4/2013 |
| WO | 00/26705 | 5/2000 |
| WO | 2006/006731 | 1/2006 |
| WO | 2008/156186 | 12/2008 |

OTHER PUBLICATIONS

Translation of Written Opinion of the International Searching Authority dated Apr. 14, 2015 in International (PCT) Application No. PCT/JP2015/057524.
International Preliminary Report on Patentability dated Sep. 20, 2016 in International (PCT) Application No. PCT/JP2015/057524.

\* cited by examiner

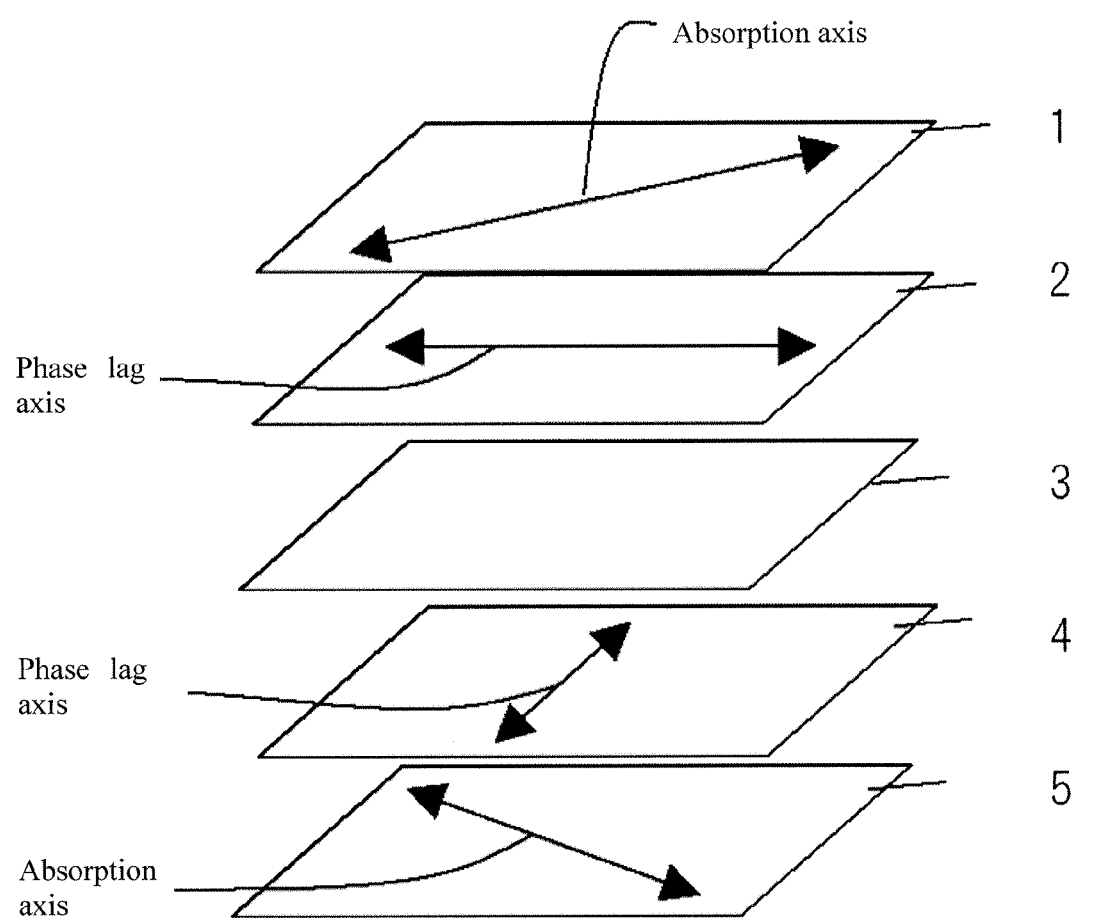

POLYCARBONATE RESIN AND OPTICAL FILM

TECHNICAL FIELD

The present invention relates to a polycarbonate resin and an optical film, wherein the polycarbonate resin has desired wavelength dispersion characteristics and has a low photoelastic constant, high heat resistance, and excellent melt processability, and wherein the optical film is obtained from the polycarbonate resin.

BACKGROUND ART

Generally, optical films, in particular retardation films, are used in display devices such as liquid crystal display devices and have functions such as color compensation, viewing angle expansion, and reflection prevention.

As the retardation film, λ/4 plates and λ/2 plates are known, and thermoplastic polymers such as polycarbonates prepared by polycondensation of bisphenol A, polyether sulfones, and polysulfones are used as materials for these plates. The λ/4 plates and λ/2 plates obtained by stretching films of these materials have a property of larger retardation at shorter wavelengths. Therefore, unfortunately, the wavelength at which the λ/4 plates and λ/2 plates can function is limited to a specific wavelength.

As a method of controlling a wavelength in a broad bandwidth, there is known a method of stacking two or more birefringent films, having different wavelength dependency of retardation, at specific angles (See, for example, PLT 1). In this case, due to use of a plurality of retardation films, steps of attaching the films and adjusting attaching angles are required, and thus, the productivity involves a problem. Moreover, as the thickness of the whole retardation film becomes large, its light transmittance lowers, resulting in an increase in the thickness and in the darkness when the film is integrated in an apparatus.

In recent years, there has been proposed a method of broadening the bandwidth using one film without such stacking (See PLT 2). This method includes a step of stretching a polymer film, wherein the polymer film is composed of a unit having positive refractivity anisotropy and a unit having negative refractivity anisotropy. However, the film specifically disclosed has a large birefringence due to a stress because of its high photoelastic constant, and has a problem of occurrence of light slipping when used as a retardation film. Furthermore, since an aromatic polycarbonate composed of a fluorene-based bisphenol skeleton is used, the film has a high melting temperature, thereby readily producing a gelled product through its decomposition when melt processed. Moreover, since the film has a high glass transition temperature (Tg), a high temperature is required for stretching the film and for steps like that, and special processing equipment different from that of the prior art is required and the like. From above reasons and the like, it cannot be said that its processability is satisfactory.

As films having a low photoelastic constant that can be produced by melt film forming, retardation films prepared by using a polycarbonate copolymer of 9,9-bis(4-hydroxy-3-methylphenyl)fluorene and an aliphatic diol and a polycarbonate copolymer of 9,9-bis[4-(2-hydroxyethoxy)phenyl]fluorene and isosorbide have been reported (see PLTs 3 and 4). However, there is no description about their durable stability, which was insufficient. Although a retardation film having a specific structure has been reported, its durable stability was still insufficient (see PLT 5). Moreover, the aforementioned PLTs have no description about significant enhancement in the durable stability by use of two kinds of fluorene-based monomers.

CITATION LIST

Patent Literature

[PLT 1] Japanese Unexamined Patent Application Publication No. 02-120804

[PLT 2] WO 2000/026705

[PLT 3] WO 2008/156186

[PLT 4] Japanese Unexamined Patent Application Publication No. 2010-134232

[PLT 5] Japanese Unexamined Patent Application Publication No. 2013-76982

SUMMARY OF INVENTION

Technical Problem

It is an object of the present invention to provide a polycarbonate resin having wavelength dispersion characteristics close to the ideal broad bandwidth, excellent durable stability and flexibility, high retardation developability, a low photoelastic constant, and excellent melt processability, and an optical film formed from the resin.

Solution to Problem

The present inventors have conducted intensive studies to achieve the object and have found that a film containing a polycarbonate resin, obtained by combining two kinds of fluorene-based monomers within a specific composition range and additionally adjusting the carbonate bonding ratio to a specific range, yields a retardation film having wavelength dispersion characteristics close to the ideal broad bandwidth and having significantly improved durable stability, excellent flexibility and a low photoelastic constant, and have reached the present invention.

That is, the present invention is as follows.

(1) A polycarbonate resin comprising:

a unit (A) represented by the following formula:

[Chem. 1]

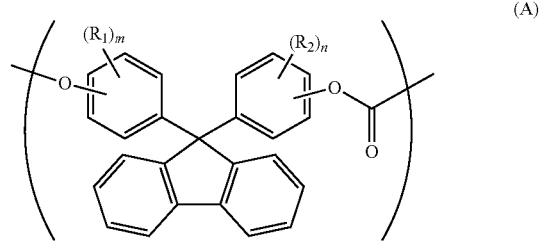

(A)

[wherein $R_1$ and $R_2$ each independently represent a hydrogen atom, hydrocarbon group having 1 to 10 carbon atoms optionally containing an aromatic group, or a halogen atom, and m and n each independently represent an integer of 0 to 4], a unit (B) represented by the following formula:

[Chem. 2]

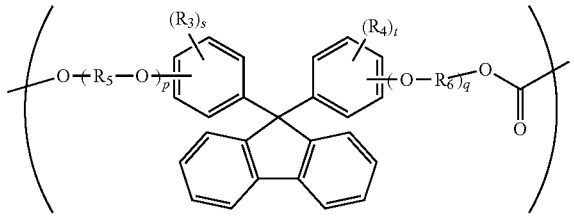

(B)

[wherein $R_3$ and $R_4$ each independently represent a hydrogen atom, hydrocarbon group having 1 to 10 carbon atoms optionally containing an aromatic group, or a halogen atom, $R_5$ and $R_6$ each independently represent a hydrocarbon group having 1 to 10 carbon atoms optionally containing an aromatic group, s and t each independently represent an integer of 0 to 4, and p and q each independently represent an integer of 1 or more], and a carbonate unit (C) derived from an aliphatic diol compound and/or alicyclic diol compound, wherein the polycarbonate resin satisfies the following expressions (I) and (II):

the molar ratio of unit $(A)$ to unit $(B)$, $(A)/(B)$, is 0.2 to 11.0, and                 (I)

the molar ratio of unit $(A)$+unit $(B)$ to unit $(A)$+unit $(B)$+unit $(C)$, $\{(A+B)/(A+B+C)\}$, is 0.30 to 0.60.     (II)

(2) The polycarbonate resin according to (1), wherein the polycarbonate resin has a glass transition temperature of 128° C. to 155° C.

(3) The polycarbonate resin according to (1), wherein the polycarbonate resin has a photoelastic constant of $30 \times 10^{-12}$ $Pa^{-1}$ or less.

(4) The polycarbonate resin according to (1), wherein the carbonate bonding ratio among the units (B) of the polycarbonate resin satisfies the following expression (III):

0.001<[{the number of carbonate bonds of unit $(B)$–unit $(B)$}/Total number of carbonate bonds]<0.3.    (III)

(5) An optical film formed from the polycarbonate resin according to (1).

(6) The optical film according to (5), wherein the optical film is molded by a melt extrusion method.

(7) The optical film according to (5), wherein the optical film is a retardation film prepared by stretching an unstretched film.

(8) The retardation film according to (7), wherein in-plane retardation values R(450), R(550), and R(650) at wavelengths of 450 nm, 550 nm, and 650 nm respectively satisfy the following expressions (1) and (2):

$0.60 \leq R(450)/R(550) \leq 1.00$     (1)

$1.01 \leq R(650)/R(550) \leq 1.40$     (2)

(9) A liquid crystal display device or organic EL display device equipped with the retardation film according to (8).

Advantageous Effects of Invention

The optical film of the present invention is composed of a polycarbonate copolymer resin having desired wavelength dispersion characteristics, a low photoelastic constant, high transparency and excellent processability. The optical film exhibits desired wavelength dispersibility through stretching process and enables broadening of the bandwidth by itself. Thus it is highly useful as an optical film for liquid crystal display devices, organic EL displays and the like.

BRIEF DESCRIPTION OF DRAWINGS

FIG. 1 is an illustration of the thermal unevenness evaluation of Examples.

DESCRIPTION OF EMBODIMENTS

The present invention will now be described in detail.

<Polycarbonate Resin>

The optical film of the present invention is formed from a polycarbonate resin comprising unit (A), unit (B), and unit (C).

(Unit (A))

Unit (A) is represented by the following formula.

[Chem. 3]

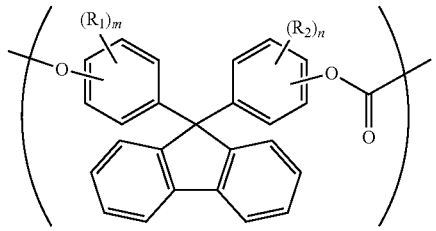

(A)

In unit (A), $R_1$ and $R_2$ each independently represent a hydrogen atom, hydrocarbon group having 1 to 10 carbon atoms optionally containing an aromatic group, or a halogen atom. Examples of the hydrocarbon group include alkyl groups having 1 to 10 carbon atoms, cycloalkyl groups having 5 to 10 carbon atoms, aryl groups having 6 to 10 carbon atoms, aralkyl groups having 7 to 10 carbon atoms, and alkenyl groups having 1 to 10 carbon atoms. Examples of the halogen atom include a fluorine atom, a chlorine atom, and a bromine atom.

m and n each independently represent an integer of 0 to 4.

Units (A) include a unit derived from 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, 9,9-bis(4-hydroxy-3-phenylphenyl)fluorene and the like. The compound yielding these units (A1) (defined below) can be used singly or in a combination of two or more.

Unit (A1), represented in the following formula, derived from 9,9-bis(4-hydroxyphenyl)fluorene or 9,9-bis(4-hydroxy-3-methylphenyl)fluorene is preferable, and unit (A1) derived from 9,9-bis(4-hydroxy-3-methylphenyl)fluorene is particularly preferable.

[Chem. 4]

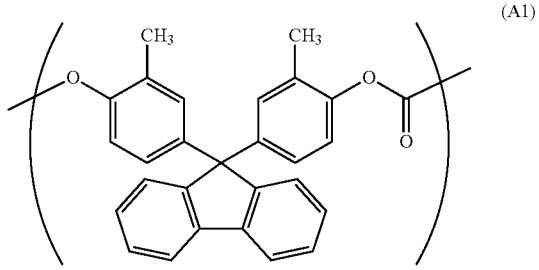

(A1)

The b value, which is obtained by measuring a solution prepared by dissolving 10 g of the polycarbonate copolymer in 50 ml of ethanol at an optical path length of 30 mm in, of a polycarbonate copolymer containing unit (A1) is preferably 6.0 or less, more preferably 5.5 or less, and still more preferably 5.0 or less. When the b value falls within the above range, an optical film formed from the polycarbonate copolymer has a good hue and high strength.

The raw material of the unit (A1), 9,9-bis(4-hydroxy-3-methylphenyl)fluorene, is obtained by a reaction of o-cresol and a fluorenone. 9,9-bis(4-hydroxy-3-methylphenyl)fluorene having a small b value, can be obtained by removing impurities.

Specifically, after the reaction of o-cresol and the fluorenone, unreacted o-cresol is distilled off. Then, the residue is dissolved in an alcohol-based, ketone-based, or benzene derivative-based solvent, and activated earth or activated carbon is added to the obtained solution. After the resulting mixture is filtered, a product crystallized from the filtrate is filtered to obtain purified 9,9-bis(4-hydroxy-3-methylphenyl)fluorene. Examples of the impurities removed include 2,4'-dihydroxy isomer, 2,2'-dihydroxy isomer, and impurities having an unknown structure. The alcohol-based solvent used for the purification is preferably a lower alcohol such as methanol, ethanol, propanol, or butanol. The ketone-based solvent is preferably a lower aliphatic ketone such as acetone, methyl ethyl ketone, methyl isopropyl ketone or cyclohexanone, or a mixture thereof. The benzene derivative-based solvent is preferably toluene, xylene, benzene, or a mixture thereof. The amount of the solvent used may be an amount enough to dissolve the fluorene compound completely, and is generally 2 to 10 times the amount of the fluorene compound. Commercially available activated earth is used which contains powdery or granular silica-alumina as the main component. Additionally, commercially available powdery or granular activated carbon is used.

(Unit (B))

Unit (B) is represented by the following formula.

[Chem. 5]

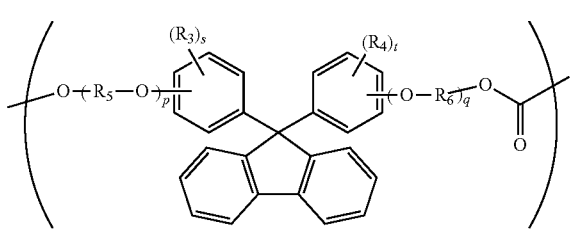

(B)

In unit (B), $R_3$ and $R_4$ each independently represent a hydrogen atom, hydrocarbon group having 1 to 10 carbon atoms optionally containing an aromatic group, or a halogen atom. Examples of the hydrocarbon group include alkyl groups having 1 to 10 carbon atoms, cycloalkyl groups having 5 to 10 carbon atoms, aryl groups having 6 to 10 carbon atoms, aralkyl groups having 7 to 10 carbon atoms, and alkenyl groups having 1 to 10 carbon atoms. Examples of the halogen atom include a fluorine atom, chlorine atom, and bromine atom.

$R_5$ and $R_6$ each independently represent a hydrocarbon group having 1 to 10 carbon atoms optionally containing an aromatic group. The hydrocarbon group is preferably an alkylene group having 1 to 10 carbon atoms, more preferably an alkylene group having 1 to 4 carbon atoms, and still more preferably an ethylene group.

p and q each represent the number of recurring units —($R_5$—O)— and —(O—$R_6$)—. p and q are each independently an integer of 1 or more, preferably an integer of 1 to 20, more preferably an integer of 1 to 12, still more preferably an integer of 1 to 8, particularly preferably an integer of 1 to 4, and most preferably 1.

s and t each independently represent an integer of 0 to 4.

The units (B) include 9,9-bis[4-(2-hydroxyethoxy)phenyl]fluorene, 9,9-bis[4-(3-hydroxypropoxy)phenyl]fluorene, 9,9-bis[4-(4-hydroxybutoxy)phenyl]fluorene, 9,9-bis[4-(2-hydroxyethoxy)-3-methylphenyl]fluorene, 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(2-hydroxyethoxy)-3-isopropylphenyl]fluorene, 9,9-bis[4-(2-hydroxyethoxy)-3-n-butylphenyl]fluorene, 9,9-bis[4-(2-hydroxyethoxy)-3-isobutylphenyl]fluorene, 9,9-bis[4-(2-hydroxyethoxy)-3-(1-methylpropyl)phenyl]fluorene, 9,9-bis[4-(3-hydroxypropoxy)-3-methylphenyl]fluorene, 9,9-bis[4-(4-hydroxybutoxy)-3-methylphenyl]fluorene, 9,9-bis[4-(2-hydroxyethoxy)-3,5-dimethylphenyl]fluorene, 9,9-bis[4-(2-hydroxyethoxy)-2,5-dimethylphenyl]fluorene, 9,9-bis[4-(2-hydroxyethoxy)-3,5-diethylphenyl]fluorene, 9,9-bis[4-(2-hydroxyethoxy)-3,5-dipropylphenyl]fluorene, 9,9-bis[4-(2-hydroxyethoxy)-3,5-diisopropylphenyl]fluorene, 9,9-bis[4-(2-hydroxyethoxy)-3,5-di-n-butylphenyl]fluorene, 9,9-bis[4-(2-hydroxyethoxy)-3,5-diisobutylphenyl]fluorene, 9,9-bis[4-(2-hydroxyethoxy)-3,5-bis(1-methylpropyl)phenyl]fluorene, 9,9-bis[4-(3-hydroxypropoxy)-3,5-dimethylphenyl]fluorene, 9,9-bis[4-(4-hydroxybutoxy)-3,5-dimethylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 9,9-bis[4-(2-hydroxyethoxy)-3,5-diphenylphenyl]fluorene, 9,9-bis[4-(2-hydroxyethoxy)-3-benzylphenyl]fluorene, 9,9-bis[4-(2-hydroxyethoxy)-3,5-dibenzylphenyl]fluorene, 9,9-bis[4-(2-hydroxyethoxy)-3-propenylphenyl]fluorene, 9,9-bis[4-(2-hydroxyethoxy)-3-fluorophenyl]fluorene and units derived from these 9,9-bis(hydroxy alkyloxyphenyl)fluorene, and also include units derived from 9,9-bis[hydroxypoly(alkyleneoxy)phenyl]fluorene having p and q of 2 or more.

Among these, 9,9-bis[4-(2-hydroxyethoxy)phenyl]fluorene, 9,9-bis[4-(2-hydroxyethoxy)-3-methylphenyl]fluorene and the like are preferable.

Particularly, a unit (B1) derived from 9,9-bis[4-(2-hydroxyethoxy)phenyl]fluorene (BPEF) shown in the following formula is preferable.

[Chem. 6]

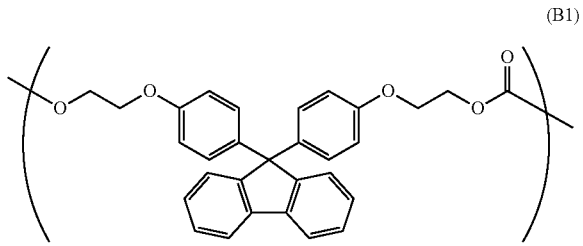

(B1)

These compounds inducing units (B1) can be used singly or in combination or two or more.

The compound from which the unit (B1) is derived is obtained by a reaction of 9,9-bis(hydroxyphenyl)fluorene and a compound corresponding to the groups $R_3$ and $R_4$ (such as alkylene oxide and haloalkanol). For example, 9,9-bis[4-(2-hydroxyethoxy)phenyl]fluorene is obtained by adding ethylene oxide to 9,9-bis(4-hydroxyphenyl)fluorene. 9,9-bis[4-(3-hydroxypropoxy)phenyl]fluorene is obtained by reacting, for example, 9,9-bis[4-hydroxyphenyl]fluorene with 3-chloropropanol under an alkaline condition. Incidentally, 9,9-bis(hydroxyphenyl)fluorene can be obtained by a reaction of a fluorenone (such as 9-fluorenone) and a corresponding phenol. 9,9-bis(4-hydroxyphenyl)fluorene can be obtained, by a reaction of a phenol and 9-fluorenone, for example.

(Unit (C))

Unit (C) is a carbonate unit (C) derived from an aliphatic diol compound and/or alicyclic diol compound. An aliphatic diol compound and alicyclic diol compounds include diol compounds described in WO 2004/111106 and WO 2011/021720 and oxyalkylene glycols, such as diethylene glycol, triethylene glycol, tetraethylene glycol, the polyethylene glycol.

The above aliphatic diol compounds include 1,3-propanediol, 1,4-butanediol, 1,5-pentanediol, 1,6-hexanediol, 1,8-octanediol, 1,9-nonanediol, 1,10-decanediol, 1,12-dodecanediol, 2-methyl-1,3-propanediol, neopentylglycol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexaneglycol, 1,2-octylglycol, 2-ethyl-1,3-hexanediol, 2,3-diisobutyl-1,3-propanediol, 2,2-diisoamyl-1,3-propanediol, 2-methyl-2-propyl-1,3-propanediol and the like.

The above alicyclic diol compounds include a cyclohexanedimethanol, tricyclodecane dimethanol, adamantane diol, pentacyclo pentadecane dimethanol, 3,9-bis(2-hydroxy-1,1-dimethylethyl)-2,4,8,10-tetraoxaspiro[5.5]undecane, isosorbide and the like.

For the above diol compound, alicyclic diol is preferable, and cyclohexanedimethanol, tricyclodecanedimethanol, 3,9-bis(2-hydroxy-1,1-dimethylethyl)-2,4,8,10-tetraoxaspiro[5.5]undecane and isosorbide are more preferable, and 3,9-bis(2-hydroxy-1,1-dimethylethyl)-2,4,8,10-tetraoxaspiro[5.5]undecane and isosorbide are particularly preferable.

(Composition Ratio)

The composition ratio of the polycarbonate resin of the present invention, which is the molar ratio of unit (A) to unit (B), (A)/(B), is 0.2 to 11.0, preferably 0.3 to 8.0, more preferably 0.4 to 6.0, still more preferably 0.4 to 3.0, and most preferably 0.5 to 2.5. A molar ratio (A)/(B) more than 11.0 is not preferable because it causes poor durable stability and a decrease in the retardation. In contrast, a molar ratio (A)/(B) less than 0.2 is not preferable because it causes poor flexibility and film fragility.

Additionally, the molar ratio of unit (A)+unit (B) to unit (A)+unit (B)+unit (C), (A+B)/(A+B+C) is 0.30 to 0.60, preferably 0.36 to 0.56, and more preferably 0.38 to 0.52. A molar ratio outside the range of 0.3 to 0.6 is not preferable because it causes deviation of wavelength dispersibility from an ideal straight line.

Also, the total of unit (A), unit (B), and unit (C) is preferably 50 mol % or more, more preferably 70 mol % or more, further more preferably 80 mol % or more, and particularly preferably 90 mol % or more based on the total recurring units.

(Other Diols)

Other diols include an aromatic dihydroxy compound. Specifically, included are α,α'-bis(4-hydroxyphenyl)-m-diisopropylbenzene (bisphenol M), 9,9-bis(4-hydroxy-3-methylphenyl)fluorene, 1,1-bis(4-hydroxyphenyl)cyclohexane, 1,1-bis(4-hydroxyphenyl)-3,3,5-trimethylcyclohexane, 4,4'-dihydroxy-3,3'-dimethyldiphenylsulfide, bisphenol A, 2,2-bis(4-hydroxy-3-methylphenyl)propane (bisphenol C), 2,2-bis(4-hydroxyphenyl)-1,1,1,3,3,3-hexafluoropropane (bisphenol AF) and 1,1-bis(4-hydroxyphenyl)decane.

(Carbonate Bonding Ratio)

In the polycarbonate resin of the present invention, the carbonate bonding ratio among units (B) preferably satisfies the following expression (III).

$$0.001 < [\{\text{the number of carbonate bonds of unit }(B)\text{–unit }(B)\}/\text{Total number of carbonate bonds}] < 0.3 \quad (III)$$

The carbonate bonding ratio among units (B) is more preferably 0.002 to 0.2, still more preferably 0.004 to 0.18, particularly preferably 0.01 to 0.15, and most preferably 0.05 to 0.13. A carbonate bonding ratio of 0.3 or more is not preferable because it causes a decrease in the retardation during durable stability test. Although a low carbonate bonding ratio is preferable, a carbonate bonding ratio of at least 0.001 or more occurs in polymerization reaction. It is considered that the carbonate bonding among units (B) has high molecular mobility, leading to a decrease in relaxation during durability test, which may reduce the retardation.

(Specific Viscosity: $\eta_{Sp}$)

The specific viscosity ($\eta_{SP}$) of the polycarbonate resin used in the present invention is preferably 0.20 to 1.50. When the specific viscosity is 0.20 to 1.50, good strength and molding processability are achieved. The specific viscosity ($\eta_{SP}$) is more preferably 0.25 to 1.20, and more preferably 0.30 to 0.80.

When the specific viscosity of the polycarbonate resin of the present invention is less than 0.2, the strength of injection-molded pieces is likely to be reduced. In contrast, when the specific viscosity is more than 1.50, the molding processability during injection molding is likely to be reduced.

The specific viscosity referred to in the present invention is determined in a solution prepared by dissolving 0.7 g of the polycarbonate resin in 100 ml of methylene chloride at 20° C. by using an Ostwald viscometer.

$$\text{Specific viscosity}(\eta_{SP}) = (t - t_0)/t_0$$

[$t_0$ is the flow down time in seconds for methylene chloride, and t is the flow down time in seconds for a sample solution]

Incidentally, the concrete measurement of the specific viscosity can be carried out, for example, as follows. The polycarbonate resin is first dissolved in methylene chloride in an amount of 20 to 30 times the weight of the resin, and the soluble content is collected by Celite filtration. Then, the solvent is removed from the filtrate and the resultant residue is dried completely so as to obtain the solid soluble in methylene chloride. The specific viscosity at 20° C. of a solution prepared by dissolving 0.7 g of the solid in 100 ml of methylene chloride is determined by using an Ostwald viscometer.

(Glass Transition Temperature: Tg)

The glass transition temperature (Tg) of the polycarbonate resin used in the present invention is preferably 128 to 155° C., more preferably 133 to 150° C., still more preferably 135 to 148° C., and most preferably 137 to 148° C. When the glass transition temperature (Tg) is lower than 128° C., the heat-resistant stability is poor and the retardation value changes with time, which may affect the display quality. When the glass transition temperature (Tg) is higher than 155° C., melt film formation may become difficult because the viscosity is extremely high. The glass transition temperature (Tg) is measured by using a 2910 DSC of TA Instrument Japan Co., Ltd. at a temperature raising rate of 20° C./min.

(Photoelastic Constant)

The absolute value of the photoelastic constant of the polycarbonate resin used in the present invention is preferably $30 \times 10^{-12}$ $Pa^{-1}$ or less, more preferably $28 \times 10^{-12}$ $Pa^{-1}$ or less, further more preferably $25 \times 10^{-12}$ $Pa^{-1}$ or less, and particularly preferably $23 \times 10^{-12}$ $Pa^{-1}$ or less. When the absolute value is larger than $30 \times 10^{-12}$ $Pa^{-1}$, the birefringence due to stress becomes large, and light slipping is likely to occur when the film is used as a retardation film. The photoelastic constant is measured by cutting out a test piece having a length of 50 mm and a width of 10 mm from a film and using a Spectroellipsometer M-220 of JASCO Corporation.

(Manufacturing Method of the Polycarbonate Resin)

The polycarbonate resin can be prepared by melt polymerization of a fluorene dihydroxy component, an aliphatic diol component and a carbonate diester.

The carbonate diester includes optionally substituted esters of aryl and aralkyl having 6 to 12 carbon atoms. Specifically, included are a diphenyl carbonate, ditrier carbonate, bis(chlorophenyl)carbonate and bis(m-cresyl)carbonate. Among these, a diphenyl carbonate is particularly preferable.

The amount of diphenylcarbonate used is preferably 0.97 to 1.10 moles, and more preferably 1.00 to 1.06 moles based on 1 mole of the total of the dihydroxy compounds.

In addition, a polymerization catalyst can be used to improve the polymerization rate in the melt polymerization method, and the polymerization catalyst includes an alkali metal compound, an alkaline earth metal compound, a nitrogen-containing compound, a metal compound and the like.

For these compounds, an organic acid salt, an inorganic salt, an oxide, a hydroxide, a hydride, an alkoxide, a quaternary ammonium hydroxide and the like, of alkali metals and alkaline earth metals, are preferably used, and can be used singly or in combination.

Alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogenphosphate, dipotassium hydrogenphosphate, dilithium hydrogenphosphate, disodium phenylphosphate, disodium salt, dipotassium salt, dicesium salt, dilithium salt of bispenol A, sodium salt, potassium salt, cesium salt, and lithium salt of phenol.

Alkaline earth metals compounds include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, and barium diacetate.

Nitrogen-containing compounds include quaternary ammonium hydroxides containing alkyl or aryl groups, such as tetramethylammonium hydroxide, tetraethylammonium hydroxide, tetrapropylammonium hydroxide, tetrabutylammonium hydroxide, trimethyl benzylammonium hydroxide and the like. Also included are tertiary amines such as triethylamine, dimethylbenzylamine, triphenyl amine and the like, and imidazoles such as 2-methylimidazole, 2-phenylimidazole, benzimidazole and the like. Further included are bases or basic salts such as ammonia, tetramethylammonium borohydride, tetrabutylammonium borohydride, tetrabutylammonium tetraphenyl borate, the tetraphenyl ammonium tetraphenyl borate. Metal compounds include zinc aluminum compound, germanium compound, organic tin compound, antimony compound, manganese compound, titanium compound, zirconium compound and the like. These compounds may be used singly or in combination of two or more.

The amount of the polymerization catalyst used is selected from the range of, preferably $1 \times 10^{-9}$ to $1 \times 10^{-2}$ equivalents, preferably $1 \times 10^{-8}$ to $1 \times 10^{-5}$ equivalents, and more preferably $1 \times 10^{-7}$ to $1 \times 10^{-3}$ equivalents based on 1 mole of the diol component.

The melt polycondensation reaction is carried out under heating and stirring in an inert gas atmosphere under reduced pressure to distill out the monohydroxy compound formed, as conventionally known.

The reaction temperature is generally in the range of 120 to 350° C., and the reaction is completed by further decompressing the system to 10 to 0.1 Torr in the latter stage of the reaction to facilitate the distillation of the formed monohydroxy compound. A terminal stopping agent, an antioxidant and the like may be added as required.

Catalytic deactivator can also be added at the latter stage of reaction. Well-known catalytic quenchers are used effectively here and among them an ammonium salt, a phosphonium salt of sulfonic acid are preferable. Further, tetrabutylphosphonium dodecylbenzenesulfonate such as dodecylbenzenesulfonate, and p-toluenesulfonate such as tetrabutylammonium p-toluenesulfonate are preferable.

Esters of the sulfonate, such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, and phenyl p-toluenesulfonate, are preferably used. Among them, tetrabutylphosphonium dodecylbenzenesulfonate is most preferably used. When at least one polymerization catalyst selected from alkali metal compounds and/or alkali earth metal compounds is used, the amount of the catalyst deactivator is preferably 0.5 to 50 moles, more preferably 0.5 to 10 moles, and still more preferably 0.8 to 5 moles based on 1 mole of the catalyst.

In addition, following additives can be blended, depending on use or need, such as heat stabilizer, plasticizer, light stabilizer, polymerization metal deactivator, flame retardant, lubricant, antistatic agent, surfactant, antifungus agent, UV absorber, mold release agent and the like.

<Optical Film>

The optical film of the present invention will be described. This optical film is a film used for optical purposes. Specific examples of the optical film include retardation film, plastic cell substrate film, polarizing plate protective film, antireflection film, brightness enhancing film, protective film for optical disks, and diffusion film. Particularly, retardation film, polarizing plate protective film, and antireflection film are preferable.

Examples of the method for producing an optical film include known methods such as solution casting, melt extrusion, hot press, and calendering methods. As the method for producing the optical film of the present invention, solution casting and melt extrusion methods are preferable, and melt extrusion method is particularly preferable from the viewpoint of productivity.

In the melt extrusion method, preferably used is a following process: a resin is extruded using a T die and the extruded resin is supplied onto a cooling roll. The temperature in this process is determined by the molecular weight, Tg, melt flowability and the like of the polycarbonate copolymer, and is preferably 180 to 350° C. and more preferably 200 to 320° C. A temperature lower than 180° C. is not preferable because it causes high viscosity, whereby the orientation and stress strain of the polymer are likely to remain. In contrast, when the temperature is higher than 350° C., problems such as thermal deterioration, coloration and a die line (streak) formation by the T die are likely to occur.

Also, since the polycarbonate resin used in the present invention has good solubility in an organic solvent, the solution casting method can also be employed. In the case of the solution casting method, methylene chloride, 1,2-dichloroethane, 1,1,2,2-tetrachloroethane, dioxolane, dioxane or the like is preferably used as the solvent. The amount of the residual solvent in the film used for the solution casting method is preferably 2% or less by weight, more preferably 1% by weight or less. An amount of the residual solvent more than 2% by weight is not preferable because it causes a remarkable drop in the glass transition temperature of the film, affecting heat resistance of the film.

The thickness of an unstretched film according to the present invention is preferably in the range of 20 to 400 μm, and more preferably in the range of 20 to 300 μm. When a retardation film is produced by stretching the film, the thickness may be determined as appropriate within the above range in consideration of the desired retardation value and thickness of the optical film.

The unstretched optical film thus obtained is stretched and oriented to be a retardation film. As the stretching method, conventional methods can be used such as monoaxial stretching in the longitudinal direction, monoaxial stretching in the transverse direction by using a tenter, or simultaneous or sequential biaxial stretching which is a combination of these. Although stretching is preferably carried out continuously from the viewpoint of productivity, it may be carried out in a batch process. The stretching temperature, relative to the glass transition temperature (Tg) of the polycarbonate copolymer, is preferably in the range of (Tg−20° C.) to (Tg+50° C.), and more preferably in the range of (Tg−10° C.) to (Tg+30° C.). This temperature range would be preferable because the molecular motion of the polymer is moderate, relaxation after stretching is unlikely to occur, and the orientation becomes easily suppressed, thereby making it easy to achieve a desired Re value.

The stretching ratio, which is determined by a retardation value intended, is preferably 1.05 to 5 times, and more preferably 1.1 to 4 times in both longitudinal and transverse directions. This stretching may be carried out in one stage or multiple stages. Incidentally, when the film obtained by the solution casting method is to be stretched, the aforementioned Tg is the glass transition temperature of the film containing a trace amount of a solvent.

(Thickness, Etc.)

The thickness of the optical film of the present invention is in the range of 20 to 200 μm, and preferably 20 to 150 μm. A desired retardation value is easily obtained by stretching and a film is easily formed within this range, thus preferable.

The polycarbonate resin constituting the optical film of the present invention has a low photoelastic constant. Accordingly, a change in the retardation by the stress is small, and a liquid crystal display provided with the aforementioned film as a retardation film will have excellent display stability.

The optical film of the present invention also has high transparency. An optical film having a thickness of 100 μm according to the present invention has a total light transmittance of preferably 85% or more, and more preferably 88% or more. The haze value of the optical film of the present invention is preferably 5% or less, and more preferably 3% or less.

(Wavelength Dispersibility)

By stretching an unstretched film prepared by using the polycarbonate resin used in the present invention, an optical film can be provided that exhibits a reverse wavelength dispersibility in which the in-plane retardation of the film becomes smaller as the wavelength becomes shorter in a visible wavelength region of 400 to 800 nm. The stretched retardation film desirably satisfies the conditions of the following expressions (1) and (2).

$$0.60 < R(450)/R(550) < 1.00 \qquad (1)$$

$$1.01 < R(650)/R(550) < 1.40 \qquad (2)$$

The film preferably satisfies the conditions of the following expressions (1-1) and (2-1).

$$0.65 < R(450)/R(550) < 0.92 \qquad (1\text{-}1)$$

$$1.02 < R(650)/R(550) < 1.35 \qquad (2\text{-}1)$$

The film more preferably satisfies the conditions of the following expressions (1-2) and (2-2).

$$0.70 < R(450)/R(550) < 0.90 \qquad (1\text{-}2)$$

$$1.03 < R(650)/R(550) < 1.30 \qquad (2\text{-}2)$$

The film further preferably satisfies the conditions of the following expressions (1-3) and (2-3).

$$0.70 < R(450)/R(550) < 0.87 \qquad (1\text{-}3)$$

$$1.03 < R(650)/R(550) < 1.20 \qquad (2\text{-}3)$$

The film further preferably satisfies the conditions of the following expressions (1-4) and (2-4).

$$0.70 < R(450)/R(550) < 0.86 \qquad (1\text{-}4)$$

$$1.03 < R(650)/R(550) < 1.10 \qquad (2\text{-}4)$$

Most preferably, the film satisfies the conditions of the following expressions (1-5) and (2-5).

$$0.70 < R(450)/R(550) < 0.85 \qquad (1\text{-}5)$$

$$1.03 < R(650)/R(550) < 1.10 \qquad (2\text{-}5)$$

The in-plane retardation R herein, defined by the following expression, is a property indicating a phase delay between the X direction of light passing in a direction perpendicular to the film and Y direction perpendicular to the X direction.

$$R=(n_x-n_y)\times d$$

Wherein $n_x$ is an in-plane refractive index of the film in the main stretching direction, $n_y$ is an in-plane refractive index perpendicular to the main stretching direction of the film, and d is a thickness of the film. The main stretching direction herein refers to a stretching direction in the case of monoaxial stretching and to a stretching direction in which the stretching is carried out to increase the degree of orientation in the case of biaxial stretching, referring to an orientation direction of a polymer main chain from the standpoint of a chemical structure.

The in-plane retardation value R(550) of the optical film at a wavelength of 550 nm is preferably R(550)≥50 nm. The optical film can be used as a λ/4 plate or λ/2 plate over a broad bandwidth in the form of a single layer without stacking layers. In such an application, preferably, the λ/4 plate satisfies 100 nm≤R(550)≤180 nm, and the λ/2 plate satisfies 220 nm≤R(550)≤330 nm.

The wavelength dispersibility of the optical film is measured by using a Spectroellipsometer M-220 manufactured by JASCO Corporation.

The optical film of the present invention can be suitably used, in particular, as a retardation film. The present invention comprises image display devices, such as liquid crystal display devices and organic EL display devices provided with the aforementioned retardation film. In the present invention, the aforementioned retardation film and a polarizing layer are formed into a circularly polarizing film, which can be suitably used as an antireflection film. The retardation film can be also suitably used as a polarizing plate protective film or an optical compensation film for image display devices.

EXAMPLES

The present invention will be described in detail referring to Examples, while the present invention is not intended to be limited to these. Incidentally, "part" stands for "part by weight" in Examples. Resins and evaluation methods used in Examples are as follows.

1. Photoelastic Constant

The photoelastic constant was obtained by the measurement on a 50-mm long and 10-mm wide test piece cut out from the film by using a Spectroellipsometer M-220 of JASCO Corporation.

2. Retardation and Wavelength Dispersibility

A 100-mm long and 70-mm wide test piece cut out from the film and stretched 2.0 times in longitudinal direction at a stretching temperature of Tg+10° C. The center portion of the retardation film obtained was used to determine the retardation and wavelength dispersibility by using a Spectroellipsometer M-220 manufactured by JASCO Corporation.

3. Glass Transition Temperature (Tg)

The glass transition temperature (Tg) of was measured by using a 2910 DSC of TA Instrument Japan Co., Ltd. at a temperature raising rate of 20° C./min under a nitrogen atmosphere.

4. Polymer Composition Ratio (NMR)

The polymer composition ratio was determined by using a proton NMR, JNM-AL400 manufactured by JEOL Ltd.

A carbonate bonding ratio among the units (B) was calculated from the total number of carbonate bonds and the number of carbonate bonds among units (B) measured by using a carbon NMR.

5. Specific Viscosity

The specific viscosity was determined from a solution prepared by dissolving 0.7 g of the polycarbonate resin in 100 ml of methylene chloride at 20° C. by using an Ostwald viscometer.

$$\text{Specific viscosity}(\eta_{SP})=(t-t_0)/t_0$$

[$t_0$ is the flow down time in seconds for methylene chloride, and t is the flow down time in seconds for a sample solution]

6. Film Formability

A film was formed over 8 hours on a 15 mm-diameter twin-screw extruder manufactured by TECHNOVEL CORPORATION equipped with a 150-mm wide T-die having a lip width of 500 μM and a film take-up apparatus. The case where film forming was interrupted due to film breakage was rated as x, and the case where the film was rolled up without breakage was rated as ○.

7. Decrease in Retardation

After a stretched film was thermally treated at 85° C. for 250 hours, the retardation was measured and a decrease in the retardation was evaluated. The decrease in the retardation is preferably 6 nm or less, more preferably 5 nm or less, still more preferably 4 nm or less, and particularly preferably 3 nm or less.

8. Thermal Unevenness Evaluation

A linear polarizing plate was provided which had a structure in which a polarizing film formed from polyvinyl alcohol with iodine adsorbed and oriented thereon was sandwiched by a pair of triacetyl cellulose films, and on one side of which an acrylic pressure sensitive adhesive layer was provided. The stretched film prepared in Examples was subjected to corona discharge treatment under a condition of an integrated irradiation dose of 1500 J. The surface subjected to corona discharge treatment was allowed to adhere on the acrylic pressure-sensitive adhesive layer side of the linear polarizing plate at an angle of 45°. Two such polarizing plates were prepared and they were adhered on alkali-free glass (manufactured by Corning Japan Inc., trade name: EAGLE2000) via pressure adhesive as shown in FIG. 1. When the assembled circularly polarizing plate, immediately after storage at 90° C. for 240 minutes, was irradiated by a backlight, the light slipping of the transmitted light was visually evaluated. The case without light slipping was rated as ○, the case where light slipping was slightly observed was rated as Δ, and the case where light slipping was entirely observed was rated as X.

Example 1

<Production of Polycarbonate Copolymer>

In a nitrogen atmosphere, 14.8 parts of 9,9-bis(4-hydroxy-3-methylphenyl)fluorene (abbreviated as BCF hereinafter), 70.5 parts of 9-bis[4-(2-hydroxyethoxy)phenyl]fluorene (abbreviated as BPEF hereinafter), 58.4 parts of 3,9-bis(2-hydroxy-1,1-dimethylethyl)-2,4,8,10-tetraoxaspiro[5.5]undecane (abbreviated as SPG hereinafter), 85.7 parts of diphenyl carbonate, and $3.6\times10^{-3}$ parts of tetramethylammonium hydroxide and $1.6\times10^{-4}$ parts of sodium hydrogen carbonate as catalysts were heated under a nitrogen atmosphere to 180° C. and the resulting mixture was melted. Thereafter, the degree of decompression was adjusted to 13.4 kPa over 30 minutes. Then, the temperature was raised to 260° C. at a rate of 20° C./hr and maintained at that temperature for 10 minutes, and the degree of decompression was adjusted to 133 Pa or lower over 1 hour. A reaction was carried out under stirring for a total of 6 hours.

After the reaction was completed, tetrabutylphosphonium dodecylbenzenesulfonate was added in an amount of 1.5 molar times the amount of the catalysts to deactivate the catalysts. Then, the resulting product was discharged from the bottom of the reaction tank under a pressurized nitrogen atmosphere and cut using a pelletizer while cooling in a water tank to obtain pellets.

<Production of Optical Film>

Subsequently, the resulting polycarbonate copolymer was formed into a film on a 15 mm-diameter twin-screw extruder manufactured by TECHNOVEL CORPORATION, equipped with a 150-mm wide T-die having a lip width of 500 μm and a film take-up apparatus to obtain a transparent extruded film. The evaluation results are shown in Table 1.

Example 2

<Production of Polycarbonate Copolymer Resin>

Exactly the same operation as in Example 1 was repeated to obtain an aliphatic-aromatic polycarbonate copolymer except that 22.2 parts of BCF, 60.2 parts of BPEF, and 59.6 parts of SPG were used.

<Production of Optical Film>

Then, a film was formed in the same manner as in Example 1. The evaluation results are shown in Table 1.

Example 3

<Production of Polycarbonate Copolymer Resin>

Exactly the same operation as in Example 1 was repeated to obtain an aliphatic-aromatic polycarbonate copolymer except that 25.2 parts of BCF, 51.6 parts of BPEF, and 63.2 parts of SPG were used.

<Production of Optical Film>

Then, a film was formed in the same manner as in Example 1. The evaluation results are shown in Table 1.

Example 4

<Production of Polycarbonate Copolymer Resin>

Exactly the same operation as in Example 1 was repeated to obtain an aliphatic-aromatic polycarbonate copolymer except that 32.6 parts of BCF, 39.6 parts of BPEF, and 65.6 parts of SPG were used.

<Production of Optical Film>

Then, a film was formed in the same manner as in Example 1. The evaluation results are shown in Table 1.

Example 5

<Production of Polycarbonate Copolymer Resin>

Exactly the same operation as in Example 1 was repeated to obtain an aliphatic-aromatic polycarbonate copolymer except that 38.5 parts of BCF, 29.2 parts of BPEF, and 68.0 parts of SPG were used.

<Production of Optical Film>

Then, a film was formed in the same manner as in Example 1. The evaluation results are shown in Table 1.

Example 6

<Production of Polycarbonate Copolymer Resin>

Exactly the same operation as in Example 1 was repeated to obtain an aliphatic-aromatic polycarbonate copolymer except that 43.0 parts of BCF, 22.4 parts of BPEF, and 69.1 parts of SPG were used.

<Production of Optical Film>

Then, a film was formed in the same manner as in Example 1. The evaluation results are shown in Table 1.

Example 7

<Production of Polycarbonate Copolymer Resin>

Exactly the same operation as in Example 1 was repeated to obtain an aliphatic-aromatic polycarbonate copolymer except that 22.2 parts of BCF, 49.9 parts of BPEF, 31.5 parts of isosorbide (abbreviated as ISS hereinafter), and 3.9 parts of polyethylene glycol having a molecular weight of 1000 (abbreviated as PEG hereinafter) were used.

<Production of Optical Film>

Then, a film was formed in the same manner as in Example 1. The evaluation results are shown in Table 1.

Example 8

<Production of Polycarbonate Copolymer Resin>

Exactly the same operation as in Example 1 was repeated to obtain an aliphatic-aromatic polycarbonate copolymer except that 32.6 parts of BCF, 32.7 parts of BPEF, 32.9 parts of ISS, and 5.9 parts of PEG were used.

<Production of Optical Film>

Then, a film was formed in the same manner as in Example 1. The evaluation results are shown in Table 1.

Example 9

<Production of Polycarbonate Copolymer Resin>

Exactly the same operation as in Example 1 was repeated to obtain an aliphatic-aromatic polycarbonate copolymer except that 38.5 parts of BCF, 20.6 parts of BPEF, 34.4 parts of ISS, and 7.8 parts of PEG were used.

<Production of Optical Film>

Then, a film was formed in the same manner as in Example 1. The evaluation results are shown in Table 1.

Example 10

<Production of Polycarbonate Copolymer Resin>

Exactly the same operation as in Example 1 was repeated to obtain an aliphatic-aromatic polycarbonate copolymer except that 29.6 parts of BCF, 29.2 parts of BPEF, 24.6 parts of ISS, and 8.3 parts of diethylene glycol (abbreviated as DEG hereinafter) were used.

<Production of Optical Film>

Then, a film was formed in the same manner as in Example 1. The evaluation results are shown in Table 1.

Comparative Example 1

<Production of Polycarbonate Copolymer Resin>

Exactly the same operation as in Example 1 was repeated to obtain an aliphatic-aromatic polycarbonate copolymer except that 3.0 parts of BCF, 92.9 parts of BPEF, and 52.5 parts of SPG were used.

<Production of Optical Film>

Then, a film was formed in the same manner as in Example 1. The evaluation results are shown in Table 1.

Comparative Example 2

<Production of Polycarbonate Copolymer Resin>

Exactly the same operation as in Example 1 was repeated to obtain an aliphatic-aromatic polycarbonate copolymer except that 5.9 parts of BCF, 84.3 parts of BPEF, and 56.0 parts of SPG were used.

<Production of Optical Film>

Then, a film was formed in the same manner as in Example 1. The evaluation results are shown in Table 1.

Comparative Example 3

<Production of Polycarbonate Copolymer Resin>

Exactly the same operation as in Example 1 was repeated to obtain an aliphatic-aromatic polycarbonate copolymer except that 50.4 parts of BCF, 6.9 parts of BPEF, and 73.9 parts of SPG were used.

<Production of Optical Film>

Then, a film was formed in the same manner as in Example 1. The evaluation results are shown in Table 1.

Comparative Example 4

<Production of Polycarbonate Copolymer Resin>

Exactly the same operation as in Example 1 was repeated to obtain an aliphatic-aromatic polycarbonate copolymer except that 53.4 parts of BCF, 3.4 parts of BPEF, and 73.9 parts of SPG were used.

<Production of Optical Film>

Then, a film was formed in the same manner as in Example 1. The evaluation results are shown in Table 1.

Comparative Example 5

<Production of Polycarbonate Copolymer Resin>

Exactly the same operation as in Example 1 was repeated to obtain an aliphatic-aromatic polycarbonate copolymer except that 26.7 parts of BCF, 17.2 parts of BPEF, and 85.8 parts of SPG were used.

<Production of Optical Film>

Then, a film was formed in the same manner as in Example 1. The evaluation results are shown in Table 1.

Comparative Example 6

<Production of Polycarbonate Copolymer Resin>

Exactly the same operation as in Example 1 was repeated to obtain an aliphatic-aromatic polycarbonate copolymer except that 3.0 parts of BCF, 86.0 parts of BPEF, 26.9 parts of ISS, and 3.9 parts of PEG were used.

<Production of Optical Film>

Then, a film was formed in the same manner as in Example 1. The evaluation results are shown in Table 1.

TABLE 1-1

| | Constituent monomer (molar ratio) | | | | | | | | | Unit (A)/ Unit (B) | (Unit(A) + Unit(B))/ Total units | Carbonate ratio among units (B) |
|---|---|---|---|---|---|---|---|---|---|---|---|---|
| | Recurring unit (A) | | Recurring unit (B) | | Recurring unit (C) | | Recurring unit (C) | | | | | |
| Example 1 | BCF | 10 | BPEF | 41 | SPG | 49 | — | — | 4.1 | 0.51 | 0.14 |
| Example 2 | BCF | 15 | BPEF | 35 | SPG | 50 | — | — | 2.3 | 0.50 | 0.1 |
| Example 3 | BCF | 17 | BPEF | 30 | SPG | 53 | — | — | 1.8 | 0.47 | 0.06 |
| Example 4 | BCF | 22 | BPEF | 23 | SPG | 55 | — | — | 1.0 | 0.45 | 0.04 |
| Example 5 | BCF | 26 | BPEF | 17 | SPG | 57 | — | — | 0.7 | 0.43 | 0.02 |
| Example 6 | BCF | 29 | BPEF | 13 | SPG | 58 | — | — | 0.4 | 0.42 | 0.01 |
| Example 7 | BCF | 15 | BPEF | 29 | ISS | 55 | PEG#1000 | 1 | 1.9 | 0.44 | 0.06 |
| Example 8 | BCF | 22 | BPEF | 19 | ISS | 57.5 | PEG#1000 | 1.5 | 0.9 | 0.41 | 0.03 |
| Example 9 | BCF | 26 | BPEF | 12 | ISS | 60 | PEG#1000 | 2 | 0.5 | 0.38 | 0.01 |
| Example 10 | BCF | 20 | BPEF | 17 | ISS | 43 | DEG | 20 | 0.9 | 0.37 | 0.03 |
| Comparative Example 1 | BCF | 2 | BPEF | 54 | SPG | 44 | — | — | 27.0 | 0.56 | 0.25 |
| Comparative Example 2 | BCF | 4 | BPEF | 49 | SPG | 47 | — | — | 12.3 | 0.53 | 0.23 |
| Comparative Example 3 | BCF | 34 | BPEF | 4 | SPG | 62 | — | — | 0.1 | 0.38 | Not detected |
| Comparative Example 4 | BCF | 36 | BPEF | 2 | SPG | 62 | — | — | 0.1 | 0.38 | Not detected |
| Comparative Example 5 | BCF | 18 | BPEF | 10 | SPG | 72 | — | — | 0.6 | 0.28 | 0.02 |
| Comparative Example 6 | BCF | 2 | BPEF | 50 | ISS | 47 | PEG#1000 | 1 | 25.0 | 0.52 | 0.24 |

TABLE 1-2

| | Specific viscosity | Tg °C. | Photoelastic constant $10^{-12}$ Pa | Film formability | R(450)/ R(550) | R(650)/ R(550) | Decrease in retardation nm | Thermal unevenness evaluation |
|---|---|---|---|---|---|---|---|---|
| Example 1 | 0.313 | 130 | 20 | ○ | 0.834 | 1.068 | 5.2 | Δ |
| Example 2 | 0.343 | 134 | 19 | ○ | 0.805 | 1.078 | 3.9 | ○ |
| Example 3 | 0.324 | 134 | 18 | ○ | 0.815 | 1.075 | 1.8 | ○ |
| Example 4 | 0.351 | 137 | 18 | ○ | 0.818 | 1.074 | 1.3 | ○ |

TABLE 1-2-continued

| | Specific viscosity | Tg °C. | Photoelastic constant $10^{-12}$ Pa | Film formability | R(450)/R(550) | R(650)/R(550) | Decrease in retardation nm | Thermal unevenness evaluation |
|---|---|---|---|---|---|---|---|---|
| Example 5 | 0.313 | 140 | 17 | ○ | 0.825 | 1.071 | 1.2 | ○ |
| Example 6 | 0.334 | 141 | 16 | ○ | 0.817 | 1.073 | 1.1 | ○ |
| Example 7 | 0.359 | 147 | 27 | ○ | 0.834 | 1.068 | 4.6 | Δ |
| Example 8 | 0.341 | 143 | 26 | ○ | 0.823 | 1.072 | 2.2 | Δ |
| Example 9 | 0.365 | 136 | 25 | ○ | 0.821 | 1.073 | 2.1 | Δ |
| Example 10 | 0.323 | 139 | 28 | ○ | 0.843 | 1.065 | 2.3 | Δ |
| Comparative Example 1 | 0.314 | 128 | 23 | ○ | 0.834 | 1.068 | 9.3 | x |
| Comparative Example 2 | 0.353 | 128 | 22 | ○ | 0.845 | 1.071 | 8.8 | x |
| Comparative Example 3 | 0.261 | 143 | 16 | x | 0.821 | 1.073 | 1.3 | ○ |
| Comparative Example 4 | 0.286 | 145 | 16 | x | 0.805 | 1.077 | 1.2 | ○ |
| Comparative Example 5 | 0.355 | 124 | 14 | ○ | 0.943 | 1.026 | 4.8 | Δ |
| Comparative Example 6 | 0.341 | 135 | 28 | ○ | 0.835 | 1.069 | 6.7 | x |

INDUSTRIAL APPLICABILITY

The optical film of the present invention is useful as an optical film such as optical films for liquid crystal display devices and organic EL displays.

REFERENCE SIGNS LIST

1. Polarizing plate
2. Stretched film
3. Inorganic glass
4. Stretched film
5. Polarizing plate

The invention claimed is:

1. A polycarbonate resin comprising:
a unit (A) represented by the following formula:

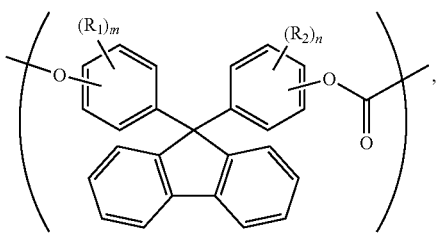

wherein $R_1$ and $R_2$ each independently represent a hydrogen atom, hydrocarbon group having 1 to 10 carbon atoms optionally containing an aromatic group, or a halogen atom, and m and n each independently represent an integer of 0 to 4, a unit (B) represented by the following formula:

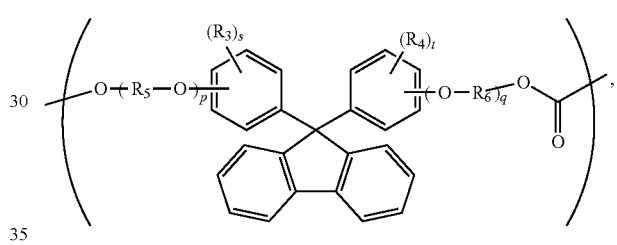

wherein $R_3$ and $R_4$ each independently represent a hydrogen atom, hydrocarbon group having 1 to 10 carbon atoms optionally containing an aromatic group, or a halogen atom, $R_5$ and $R_6$ each independently represent a hydrocarbon group having 1 to 10 carbon atoms optionally containing an aromatic group, s and t each independently represent an integer of 0 to 4, and p and q each independently represent an integer of 1 or more, and a carbonate unit (C) derived from an aliphatic diol compound and/or alicyclic diol compound, wherein the polycarbonate resin satisfies the following expressions (I) and (II):

the molar ratio of unit (A) to unit (B), (A)/(B), is 0.2 to 11.0, and (I)

the molar ratio of unit (A)+unit (B) to unit (A)+unit (B)+unit (C), {(A+B)/(A+B+C)}, is 0.30 to 0.60 and (II)

wherein the carbonate bonding ratio among the units (B) of the polycarbonate resin satisfies the following expression (III):

0.002<[{the number of carbonate bonds of unit (B)–unit (B)}/Total number of carbonate bonds]<0.2. (III)

2. The polycarbonate resin according to claim 1, wherein the polycarbonate resin has a glass transition temperature of 128° C. to 155° C.

3. The polycarbonate resin according to claim 1, wherein the polycarbonate resin has a photoelastic constant of $30 \times 10^{-12}$ $Pa^{-1}$ or less.

4. An optical film formed from the polycarbonate resin according to claim 1.

5. The optical film according to claim 4, wherein the optical film is molded by a melt extrusion method.

6. The optical film according to claim 4, wherein the optical film is a retardation film prepared by stretching an unstretched film.

7. The retardation film according to claim 6, wherein in-plane retardation values R(450), R(550), and R(650) at wavelengths of 450 nm, 550 nm, and 650 nm respectively satisfy the following expressions (1) and (2):

$$0.60 \leq R(450)/R(550) \leq 1.00 \quad (1)$$

$$1.01 \leq R(650)/R(550) \leq 1.40 \quad (2).$$

8. A liquid crystal display device or organic EL display device equipped with the retardation film according to claim 7.

* * * * *